United States Patent
Karakus et al.

(10) Patent No.: US 12,189,717 B1
(45) Date of Patent: Jan. 7, 2025

(54) AUTOMATIC PARTITIONING OF MACHINE LEARNING MODELS FOR TRAINING ACROSS MULTIPLE DEVICES

(71) Applicant: Amazon Technologies, Inc., Seattle, WA (US)

(72) Inventors: Can Karakus, Redwood City, CA (US); Rahul Raghavendra Huilgol, San Jose, CA (US); Anirudh Subramanian, Redwood City, CA (US); Fei Wu, Sunnyvale, CA (US); Christopher Cade Daniel, San Jose, CA (US); Akhil Mehra, Saratoga, CA (US); Ajay Paidi, Newark, CA (US); Yutong Zhang, Belmont, CA (US); Indu Thangakrishnan, Santa Clara, CA (US); Luis Alves Pereira Quintela, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1077 days.

(21) Appl. No.: 17/105,998

(22) Filed: Nov. 27, 2020

(51) Int. Cl.
| | |
|---|---|
| *G06F 18/21* | (2023.01) |
| *G06F 9/48* | (2006.01) |
| *G06F 9/50* | (2006.01) |
| *G06F 9/54* | (2006.01) |
| *G06F 18/211* | (2023.01) |
| *G06N 20/00* | (2019.01) |

(52) U.S. Cl.
CPC ........ *G06F 18/2163* (2023.01); *G06F 9/4881* (2013.01); *G06F 9/5066* (2013.01); *G06F 9/54* (2013.01); *G06F 18/211* (2023.01); *G06N 20/00* (2019.01); *G06F 2209/5017* (2013.01)

(58) Field of Classification Search
None
See application file for complete search history.

(56) References Cited

U.S. PATENT DOCUMENTS

| | | | |
|---|---|---|---|
| 2016/0110657 A1 * | 4/2016 | Gibiansky | G06N 20/00 706/12 |
| 2017/0344910 A1 * | 11/2017 | Wu | G06N 20/00 |
| 2019/0108442 A1 * | 4/2019 | Chang | G06N 3/045 |
| 2019/0156246 A1 * | 5/2019 | Kuo | G06N 5/04 |
| 2020/0174840 A1 * | 6/2020 | Zhao | G06F 9/5011 |
| 2020/0285891 A1 * | 9/2020 | Yellin | H04L 67/34 |
| 2021/0019152 A1 * | 1/2021 | Pudipeddi | G06N 3/084 |
| 2021/0035027 A1 * | 2/2021 | Santos | G06N 20/00 |
| 2021/0133583 A1 * | 5/2021 | Chetlur | G10L 15/16 |

(Continued)

*Primary Examiner* — Charles E Anya
(74) *Attorney, Agent, or Firm* — S. Scott Foster; Kowert, Hood, Munyon, Rankin & Goetzel, P.C.

(57) ABSTRACT

Automatic partitioning of a machine learning model may be performed for training across multiple processing devices. A training job for a machine learning model may specify a number of partitions for a machine learning model. An optimization parameter may be determined for the machine learning model. Different partitions of the machine learning model to be trained across multiple processing devices may be determined based on the specified number of partitions and the optimization parameter. A schedule for executing the training job may be generated according to the respective partitions of the machine learning model. The training job may be executed according to the schedule.

17 Claims, 8 Drawing Sheets

(56) References Cited

U.S. PATENT DOCUMENTS

2021/0191184 A1* 6/2021 Zhang ............... G02F 1/133608
2021/0374518 A1* 12/2021 Zhu ....................... G06F 9/3877
2022/0012607 A1* 1/2022 Liu ....................... G06F 9/5038

* cited by examiner

AUTOMATIC PARTITIONING OF MACHINE LEARNING MODELS FOR TRAINING ACROSS MULTIPLE DEVICES

BACKGROUND

Neural power and accuracy of machine learning models increase with increasing number of model parameters. The state-of-the-art machine learning models have billions of trainable parameters, resulting in memory usage often exceeding the capacity of individual processing devices. The processing devices commonly used for training, such as GPUs, typically have limited memory, which may impose a limit on the size of the machine learning model that can be trained with them, which in turn may limit the accuracy of the machine learning models.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of automatic partitioning of neural networks for training are described herein. For various machine learning models, such as various kinds of neural networks used for computer vision and natural language processing applications, model accuracy may be improved by increasing the size of the model. For example, the number of layers and nodes in a deep learning model may be increased to improve accuracy. State-of-the-art benchmark in computer vision and natural language processing have seen a steady increase in model accuracy from training with larger models. Language models have increased in size by a factor of 10 each year. In scenarios, large deep learning models, (e.g. GPT-3, GPT-2, and T5) may be difficult to train for new applications because their model size during training exceeds a single processing device, such as a Graphics Processor Unit (GPU) memory. For example, the GPT-2 model has 1.5 billion parameters and requires at least 18 GB in memory. GPT-3 model has 175 billion parameters and requires 350 GB in memory.

In various embodiments, automatic partitioning of machine learning models for training across multiple devices may allow for large models be trained using multiple devices in an optimal manner. Automatic partitioning may efficiently split a given model across multiple processing devices, removing processing device memory as a limiting factor. Moreover, in various embodiments, automatic partitioning of machine learning models for training across multiple devices may be invoked with minimal change to existing model training code and natively integrates with different machine learning frameworks (e.g., TensorFlow and PyTorch).

Figure 1:
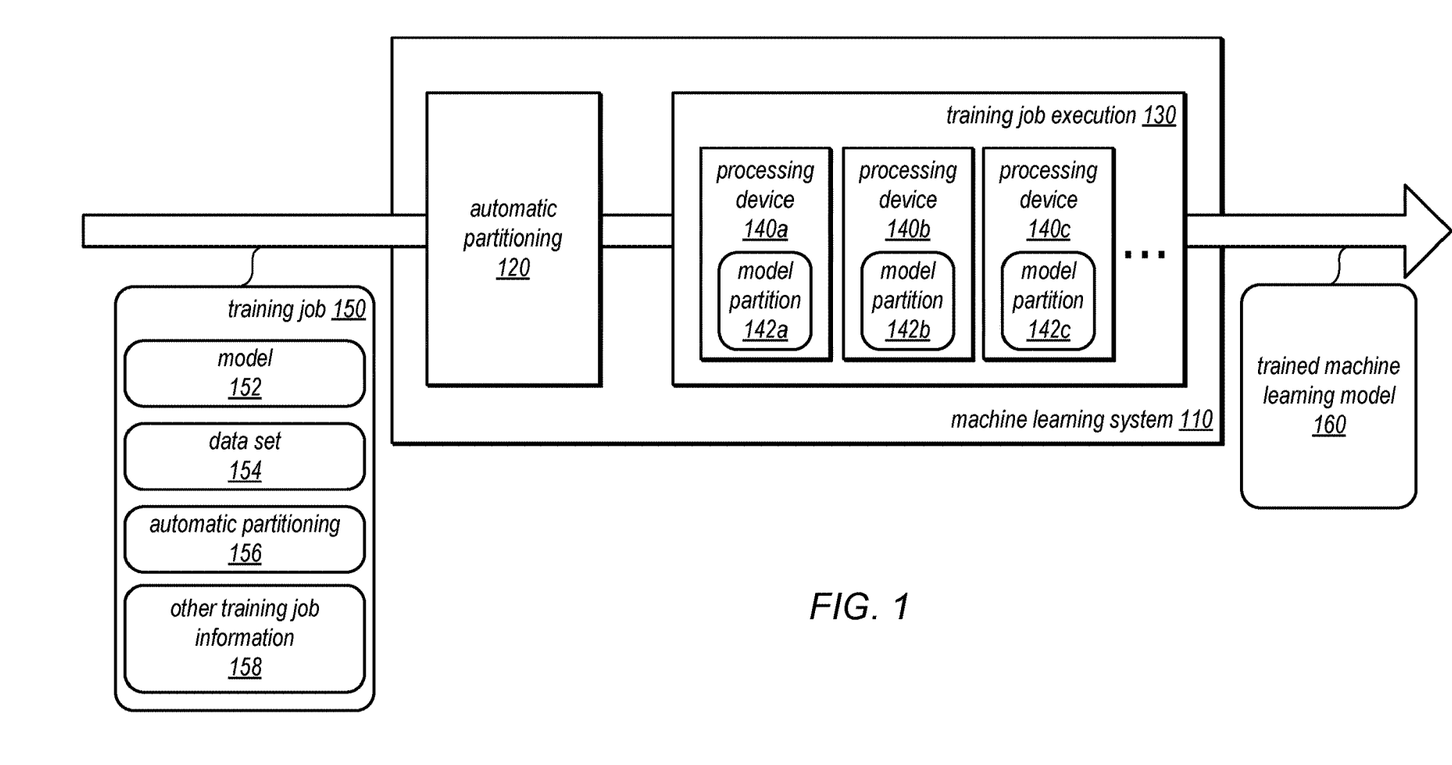
FIG. 1 illustrates a logical block diagram of automatic partitioning of machine learning models for training across multiple devices, according to some embodiments.

FIG. 1 illustrates a logical block diagram of automatic partitioning of machine learning models for training across multiple devices, according to some embodiments. Machine learning system 110 may provide an interface for receiving a training job 150. In some embodiments, the interface may be implemented as part of an integrated development environment (IDE) implemented as a standalone application or as part of a network-based service, like machine learning service 210 discussed below in FIG. 2.

Figure 3:
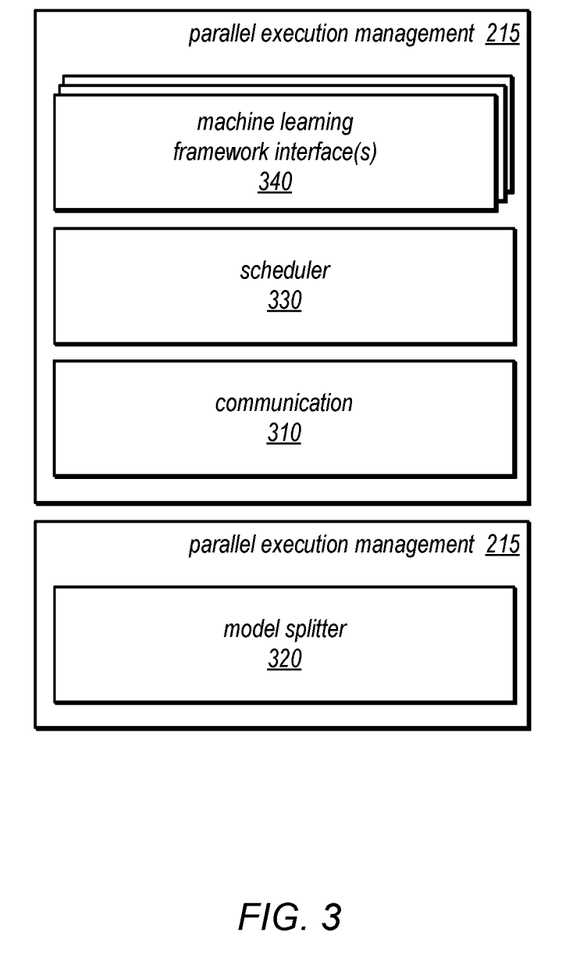
FIG. 3 illustrates a logical block diagram illustrating automatic partitioning of machine learning models and parallel execution management for training across multiple devices for different machine learning frameworks, according to some embodiments.

Training job 150 may, in some embodiments, be specified as a training script or other code that can be executed by machine learning system 110. Training job 150 may include various information including, a description and/or identification of the machine learning model 152 to train, data set 154 for training the model, information to request or invoke automatic partitioning 156, and other training job information 158. In various embodiments, automatic partition 120 may be implemented as a partitioning library (that also supports parallel execution management 215 as illustrated in FIG. 3) that can be included as part of a training job 150 script by providing various automatic partitioning 156 configuration information. For example, automatic partitioning 120 may implement an application programming interface (API) that can be invoked in training job 150. For example, in various embodiments, a configuration API for automatic partitioning 120 may allow a user to specify various features, including:
- a number of partitions into which to split the machine learning model
- a number of microbatches (or none) to perform pipelining over
- scheduling configuration (e.g., to use interleaved or simple pipelined scheduling)
- an optimization parameter to optimize for speed of information (e.g., "speed" or "memory")
- a placement strategy (e.g., for data parallelism to use spread or cluster, where cluster places a single model replica in a neighboring processing device IDS, where spread places them as far apart as possible
- a parameter to disable automatic partitioning (e.g., if manual partitioning using other features is desired)

Machine learning system 110 when executing training job 150 may then perform automatic partitioning 120 according to the various configuration information 156 in training job 150. As discussed in detail below with regard to FIGS. 3-7, automatic partitioning 120 may perform various analysis, such as a profiling run to determine performance characteristics of model 152, apply a partitioning algorithm to split the model 152 into different partitions according to an optimization parameter, and generate a schedule (e.g., a pipelined schedule with or without interleaving) for executing the training job on the partitions of the machine learning model.

In some embodiments, automatic partitioning 120 may also implement load balancing techniques, which may combine data parallelism with model parallelism, assigning a different number of data-parallel GPUs for each model partition. By assigning a larger per-GPU batch-size to partitions with lighter computational load, we plan to balance the computational load for each partition. The correct batch size assignment is part of the automated splitting algorithm. Partitioning of the machine learning model by automatic partitioning may include layerwise partitioning (e.g., discussed below with regard to FIGS. 3-7) or depthwise partitioning. For example, depthwise partitioning may split a model so that every model layer (or subset of layers) is shared across multiple processing devices, in some embodiments.

Training job execution 130 may then execute the partitioned machine learning model according to a schedule that places coordinates execution of different model partitions, such as model partitions 142*a*, 142*b*, and 142*c*, across different processing devices 140*a*, 140*b*, and 140*c*. In various embodiments, as discussed below with regard to FIG. 3, a library for automatic partitioning 120 may support communications across processing devices 142 as well as providing execution scheduling (e.g., using a pool of background threads). Various input and output operations may be inserted into the partitions of the machine learning model so that the data may be exchanged between partitions. Multiple processing devices 140 may be implemented on a same host system or across multiple host systems, exchanging information via network communications. Training job execution 130 may then provide a trained machine learning model 160, when the training job 150 complete, in various embodiments.

Please note that the previous description of is a logical illustration of automatic partitioning of machine learning models for training across multiple devices and thus is not to be construed as limiting as to the machine learning system.

This specification begins with a general description of a provider network that implements multiple different services, including a machine learning service, which may implement automatic partitioning of machine learning models for training across multiple devices. Then various examples of, including different components/modules, or arrangements of components/module that may implement automatic partitioning of machine learning models for training across multiple devices are discussed. A number of different methods and techniques to implement automatic partitioning of machine learning models for training across multiple devices are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
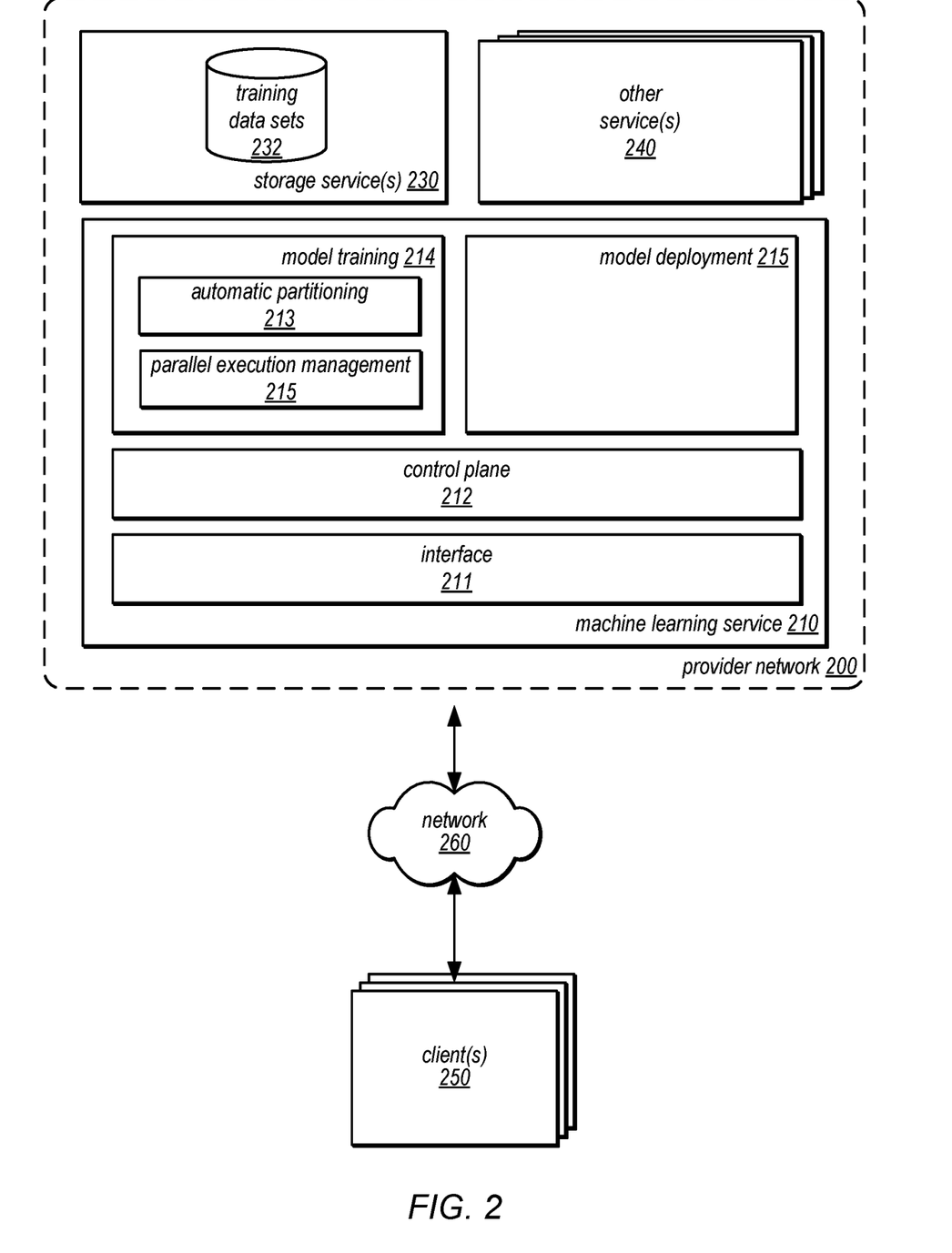
FIG. 2 illustrates an example provider network that may implement a machine learning service that performs automatic partitioning of machine learning models for training across multiple devices, according to some embodiments.

FIG. 2 illustrates an example provider network that may implement a machine learning service that performs automatic partitioning of machine learning models for training across multiple devices, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200, in one embodiment. In some embodiments, provider network 200 may implement various computing resources or services, such as machine learning service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below, in one embodiment. In various embodiments, the functionality of a given system or service component (e.g., a component of machine learning service 210 may be implemented by a particular node or may be distributed across several nodes. In some embodiments, a given node may implement the functionality of more than one service system component (e.g., more than one data store component).

Machine learning 210 may implement interface 211 to allow clients (e.g., client(s) 250 or clients implemented internally within provider network 200, such as a client application hosted on another provider network service like an event driven code execution service or virtual compute service) to compress, train, and deploy machine learning models (e.g., neural networks). For example, machine learning service 210 may implement interface 211 (e.g., a graphical user interface, as discussed above with regard to FIG. 1, programmatic interface that implements Application Program Interfaces (APIs) and/or a command line interface) may be implemented so that a client can submit, edit, or otherwise provide a training job for a machine learning model stored in storage service(s) that requests or enables automatic partitioning 213 and parallel execution management 215 and/or in other storage locations within provider network 200 or external to provider network 200 (e.g., on premise data storage in private networks). Interface 211 may allow a client to request the performance of training, deployment, or other machine learning service features, in various embodiments.

Machine learning service 210 may implement a control plane 212 to perform various control operations to implement the features of machine learning service 210. For example, control plane may monitor the health and performance of requests at different components, such as model training 214 and model deployment 215. If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s), in various embodiments. For example, control plane 212 may receive requests interface 211 which may be a programmatic interface, and identify an available node to begin work on the request.

Machine learning service 210 may implement model training 214 to execute training jobs on various machine learning models using data sets, such as data sets 232 in storage services 230 across one or more training nodes (which may include one or more respective processing devices for training, such as GPUs). In various embodiments, machine learning service 210 may implement model deployment 215, which may deploy a trained machine learning model on resources (e.g., virtual compute instances) to receive and return inferences or other results according to requests or other inputs to the deployed model.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments, Data storage service(s) 230 may include object or file data stores for putting, updating, and getting data objects or files, in some embodiments. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as image data files (e.g., digital photos or video files) audio files and web site log files. Data storage service(s) 230 may be accessed via programmatic interfaces (e.g., APIs) or graphical user interfaces.

Generally speaking, clients 250 may encompass any type of client that can submit network-based requests to provider network 200 via network 260, including requests for machine learning service 210 (e.g., a request to search or identify an object using an object recognition index, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of Object recognition service 210 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., access requests to read or write data may be via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Automatic partitioning 213 and parallel execution management may be implemented by training nodes or other features of machine learning service that execute training jobs on behalf of users or client applications, in various embodiments (e.g., as part of a common library or other feature that may be invoked in a training job). Training jobs may, as noted earlier, rely upon different machine learning frameworks, such as PyTorch, TensorFlow, or Apache MXNet, among others. Automatic partitioning 213 and parallel execution management 215 may be implemented across and independent of machine learning frameworks, in various embodiments. FIG. 3 illustrates a logical block diagram illustrating automatic partitioning of machine learning models and parallel execution management for training across multiple devices for different machine learning frameworks, according to some embodiments.

For example, parallel execution management 215 may implement different machine learning framework interface(s) 340, which may facilitate specifying partitions determined by model splitter 320 and scheduling instructions determined by scheduler 330, in various embodiments. Framework interface(s) 340 may provide a native user experience through an API corresponding to each machine learning framework. As the user specifies the model, these interfaces automatically insert operations into the computational graph as needed, as shown below with regard to FIG. 4A, such as input and output operations, which communicate with the pipelining layer in the backend engine for the machine learning framework. Machine learning framework interface(s) 340 may also have framework-specific components of the model splitting at model splitter 320, such as profiling and partition implementation, and scheduling by scheduler 330, in some embodiments.

Scheduler 330 may responsible for scheduling partition (e.g., subgraph) execution and pipelining, in various embodiments. Scheduler 330 may interface with the custom operations at the framework layer and control when a given partition is executed. Multiple pipeline schedules may be implemented, which the user can choose based on the specific application (e.g. simple or interleaved, as discussed above). The specific pipeline layer implementation may depends on whether the framework uses symbolic or imperative execution. For symbolic execution, subgraph execution schedule may be controlled by operation callbacks invoked from the backend, which signal to the framework to start computation for a given partition. For imperative frameworks (e.g., PyTorch), this may be implemented via multi-threading and thread synchronization mechanisms (e.g., supported in programming languages like Python).

Figure 4A:
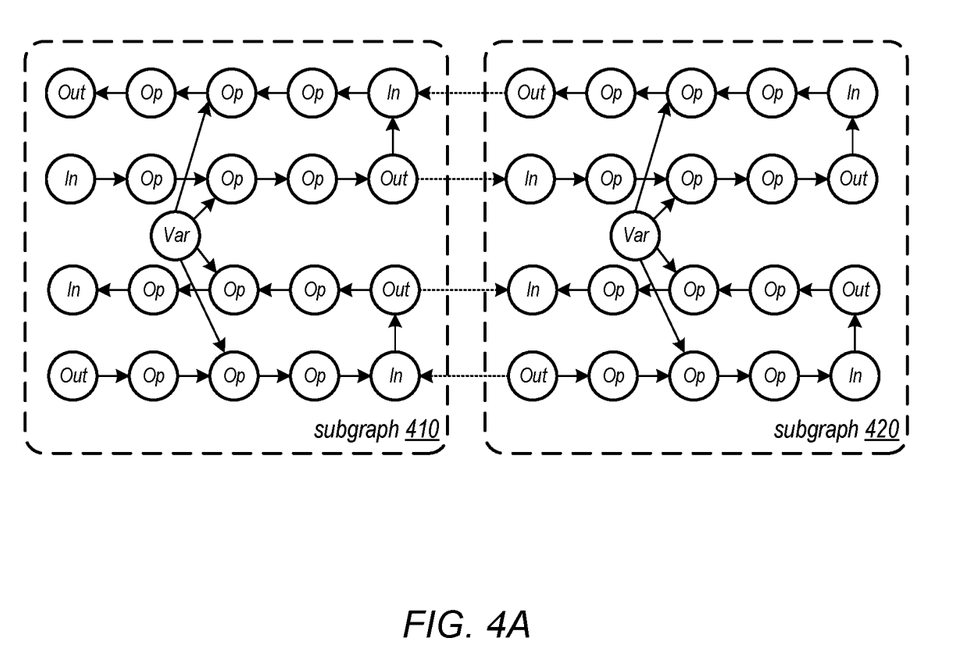
FIG. 4A illustrates an example partition of a graph of a machine learning model into two subgraphs, according to some embodiments.

FIG. 4A illustrates an example partition of a graph of a machine learning model into two subgraphs, according to some embodiments. Subgraph 410 and subgraph 420 illustrate two example partitions of a model. Each circle in a respective subgraph may indicate a respective operation in the subgraph. Batch splits may be represented in the subgraphs by the replicated variable ("Var") inputs to multiple operations. As illustrated input and output operations may be added to the model operations. Adding input ("In") and output ("Out") operations may enable communication layer 310 to transfer information (e.g., tensors) to and from one another. Input and output operations may also enable gradients to flow backward during back-propagation when training the machine learning model.

Figure 4B:
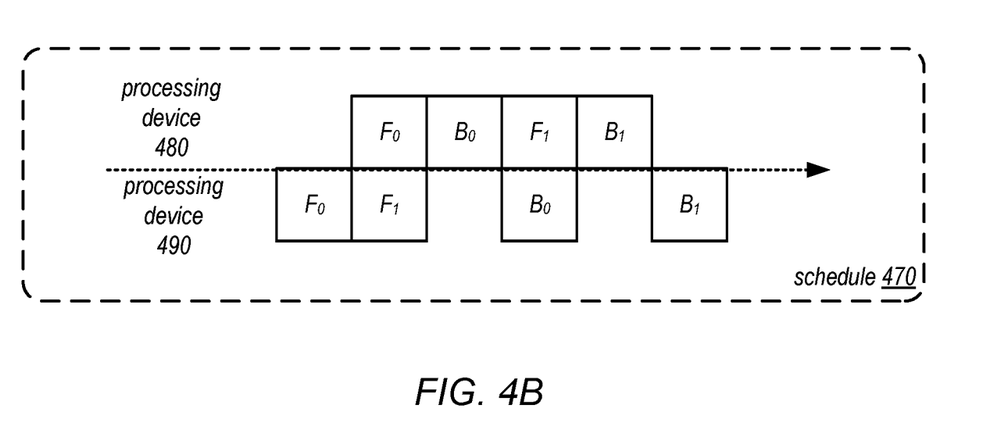
FIG. 4B illustrates an example schedule for a partitioned machine learning model, according to some embodiments.

Based on the scheduling parameters or other configuration scheduler 330 may implement a schedule, such as shown in FIG. 4B, which illustrates an example schedule for a partitioned machine learning model, according to some embodiments. In the example, scheduler 330 may provide a schedule 570 for two different processing devices 580 and 590. Interleaved execution is shown, with forward computation two batches $F_0$ and $F_1$ and backward computation two microbatches $B_0$ and $B_1$ being interleaved across different execution slots over time. In various embodiments, as the number of microbatches grows larger, the fraction of idle time execution slots may go to zero. Whenever it is time to do forward or backward computation on a specific subgraph replica, scheduler 330 may signal to the corresponding input operation to start executing, in some embodiments.

Figure 5:
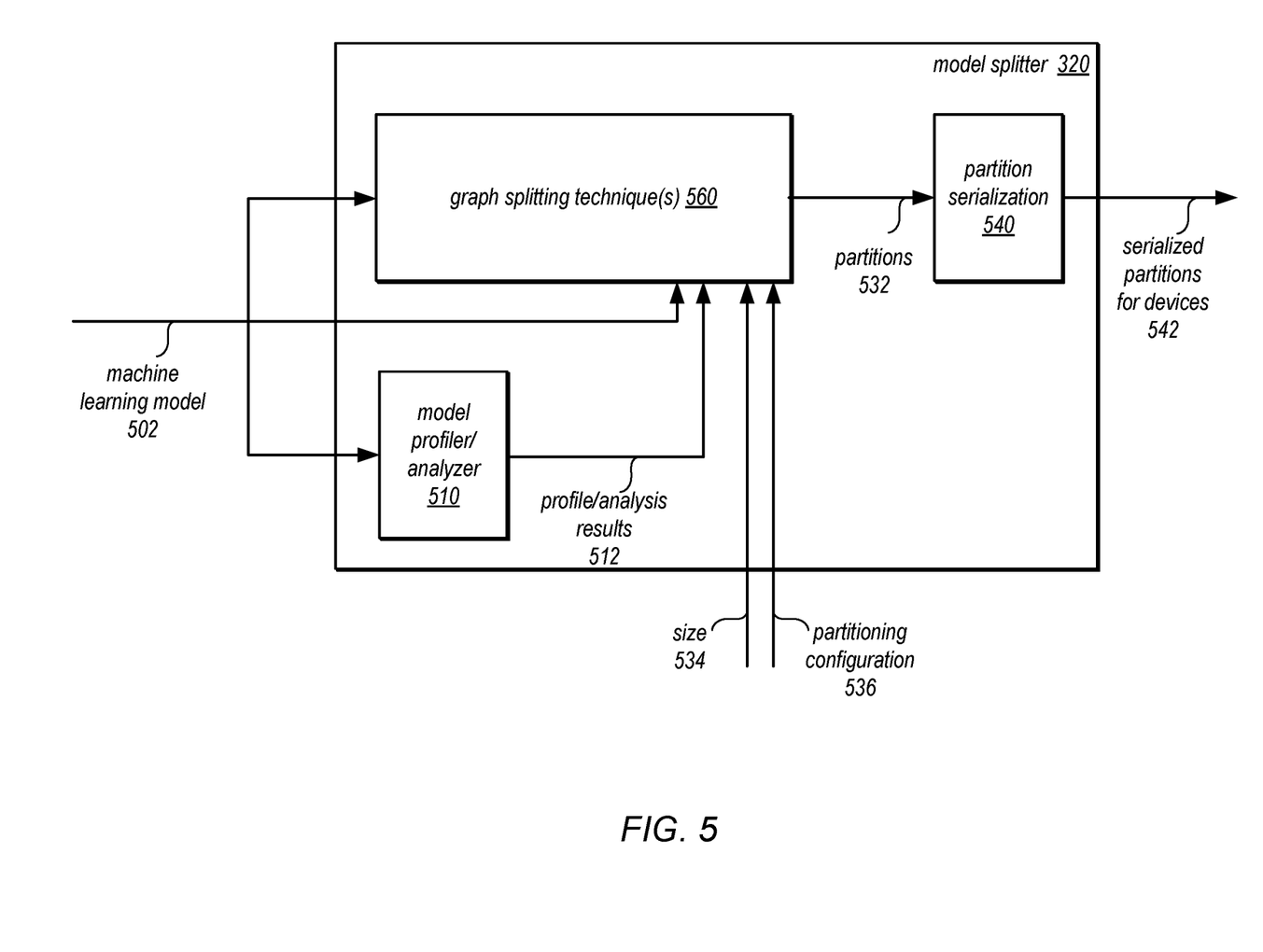
FIG. 5 illustrates a logical block diagram illustrating a model splitter, according to some embodiments.

In various embodiments, automatic partitioning 215 may implement model splitter 320, in some embodiments, which may implement one or more different splitting techniques (which may be selected via a training job or according to other features, such as the machine learning framework being utilized). Model splitter 320 may be responsible for the core, framework-independent parts of the automated model partitioning algorithm. The framework interfaces 340 may abstract away the framework-related components of model partitioning (which may include a profiling tool to determine the framework-specific memory footprint and execution time for each operation, as discussed below), and provide model splitter 320 with a framework-independent representation of the computational graph, along with the relevant metrics. This will leave the model splitter with a pure combinatorial optimization problem, which can be used to implement different partitioning techniques, such as dynamic programming, reinforcement learning, and various heuristics. The selected partitions by model splitter may be communicated to the framework layer, which implements the proposed partition, in various embodiments.

FIG. 5 illustrates a logical block diagram illustrating a model splitter, according to some embodiments. In various embodiments, model splitter 320 may implement model profiler/analyzer 510 which may execute a preliminary profiling run of the machine learning model 502, which may determine an overall graph, along with relevant metrics such as operation execution time and memory footprint. In some embodiments, model profiler/analyzer 510 may record the shapes of each operation (e.g., tensor) over a specified number of iterations, which may be a good proxy for the memory use and computation time of the operation that produced that operation. This may circumvents the problem of data-dependent operation shapes. In the case where the model does not fit on a single processing device, profiling can be done with an arbitrary partitioning of the graph. After the specified number of steps, model profiler/analyzer 510 can run the partitioning algorithm on the profiling results, output the results to a file, and exit the program. In various embodiments, model profiler/analyzer 510 is also a modular component, and as long as its interface with the splitting algorithm is clearly defined, different profilers can be plugged in. Profile analysis/results 512 may be provided for a graph splitting technique 560, such as to partition set selection in some embodiments.

Alternatively, graph splitting techniques 560 may be performed on machine learning model 502 on the fly, by analyzing the computational graph before training, and then implementing this partition during the same run. In some embodiments, a check before executing a training job using the partition splits determined from a profiling run may be performed that evaluates whether the graph determined in the training job matches the graph determined in the profiling run.

Different splitting techniques 560 may be implemented, in various embodiments. For example, various splitting (also referred to as partitioning) techniques or algorithms, including multilevel algorithms for graph partitioning like METIS, which may utilize different techniques for generating possible partitions of a graph representation of the machine learning model, may be used. For example, dynamic programming, reinforcement learning, and heuristics based partitioning techniques can be used and take as a selection criteria the optimization parameter. In some embodiments, multiple splitting techniques may be supported. FIG. discussed below, provides examples splitting techniques, A splitting technique may be selected as part of configuring a training job, in some embodiments, or according to a machine learning framework being used to train the machine learning model. Different graph splitting techniques 560 may rely upon one or more inputs, such as graph size 534, partitioning configuration 536 (e.g., including whether a partition can be contiguous or non-contiguous, an optimization parameter, such as speed or memory, profile/analysis results 512, and so on).

The output partitions 532 may be provided to partition serialization 540, in some embodiments. Partition serialization 440 may generate a serialized version of the partitioning (e.g., into Javascript Object Notation (JSON)), which may be then provided 542 to different devices for training job execution, in some embodiments. In other embodiments, no partition serialization feature 540 may be implemented (e.g., as it may not be needed for that machine learning framework).

Although FIGS. 2-5 have been described and illustrated in the context of a provider network implementing a machine learning service that implements an interface for receiving and/or specifying a training job that requests automatic partitioning, the various components illustrated and described in FIGS. 2-5 may be easily applied to other machine learning systems that execute training jobs for machine learning models. As such, FIGS. 2-5 are not intended to be limiting as to other embodiments of automatic partitioning of machine learning models for training across multiple devices.

Figure 6:
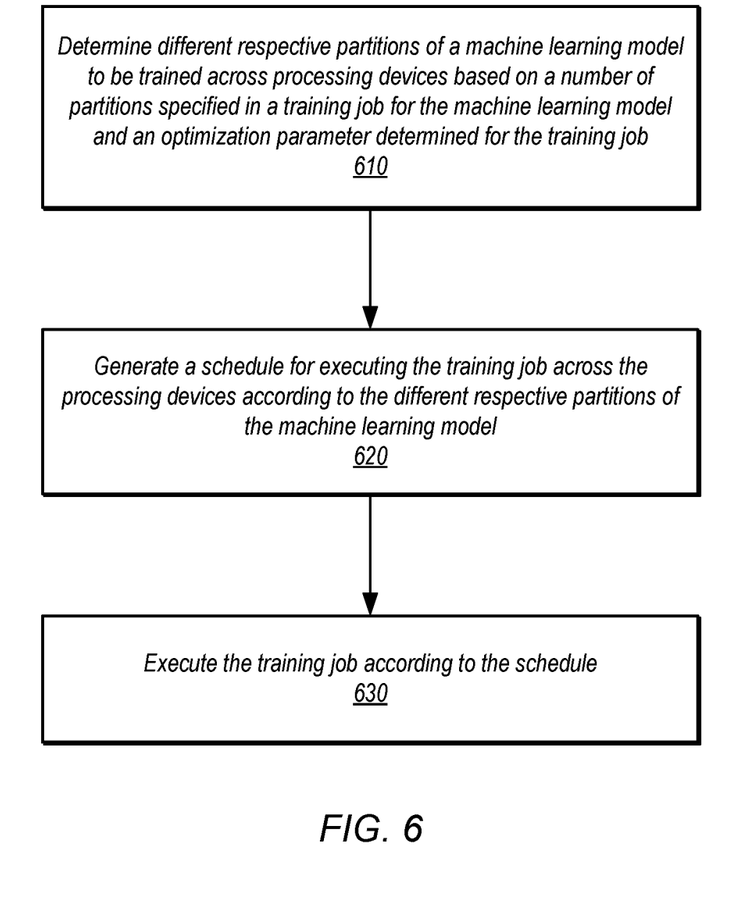
FIG. 6 illustrates a high-level flowchart of various methods and techniques to implement automatic partitioning of machine learning models for training across multiple devices, according to some embodiments.

FIG. 6 illustrates a high-level flowchart of various methods and techniques to implement automatic partitioning of machine learning models for training across multiple devices, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 610, different respective partitions of a machine learning model may be trained across processing devices based on a number of partitions specified in a training job for the machine learning model and an optimization parameter determined for the training job, in some embodiments. For example, as discussed above with regard to FIG. 1, a training job may be specified in a code file or script, written in a programming language, which may be executable by a machine learning system and received via an interface for the machine learning system. The interface may, in some embodiments, be implemented as part of a development tool, which may integrated as part of the machine learning system (e.g., a web-based editor implemented as part of a machine learning service) that provides a text editor that can specify the various features of the training job in code, including configuration information to invoke or otherwise request automatic partitioning. For example, automatic partitioning may be implemented as a software library that can be included in the training job by including the software package in the training job code along with various configuration information, as well as other information to specify features such as a step function for forward and backward passes of a model, model identification, and accumulations, among others.

The partitions of the machine learning model may be determined in various ways. For example, as discussed above with regard to FIG. 4 and below with regard to FIG. 7, partitioning may rely upon the performance of model profiling or other analysis techniques to determine various characteristics of the machine learning model, so that when divided into the specified number of partitions, balancing techniques may performed to distribute operations in the partitions according to the optimization parameter, like speed or memory. In some embodiments, a default operation parameter may be used if none is specified (e.g., a default of memory optimization).

As indicated at 620, a schedule for executing the training job across the processing devices may be generated according to the different respective partitions of the machine learning model, in some embodiments. For example, different types of scheduling for pipelined processing may be implemented which determine the order in which computations are made and data is processed across devices during model training. Pipelined execution may allow processing device i to perform (forward or backward) computation on microbatch b while processing device i+1 performs computation on microbatch b+1, thereby keeping both processing devices active at the same time.

In various embodiments, different types of scheduling may be specified in the training job. For instance, one type of scheduling may be interleaved scheduling, which interleaves execution of minibatches, which may be specified in a training job, may be performed. In various embodiments, interleaved pipeline execution schedule, mini-batches are split into microbatches, which are injected into the pipeline one after another. After a forward pass has completed for a microbatch on GPU i, this subgraph simultaneously sends output activations to the next subgraph while starting to process another microbatch. A generated schedule may interleave the forward and backward passes of different microbatches. For example, the backward pass of one microbatch may execute before the forward pass of another microbatch finishes. In another type of scheduling, simple scheduling, interleaving across devices may not be performed, in some embodiments.

As indicated at 630, the training job may be executed according to the schedule, in some embodiments. For example, the machine learning system may send, as discussed below with regard to FIG. 7, a serialized version of the partitions to different processing devices (e.g., to different nodes), which may then execute their respective portions of the model on training data, performing forward and backward processing to execute the model upon input data and then make adjustments to the weights or other parameters of operations in the model in order to improve model accuracy.

Figure 7:
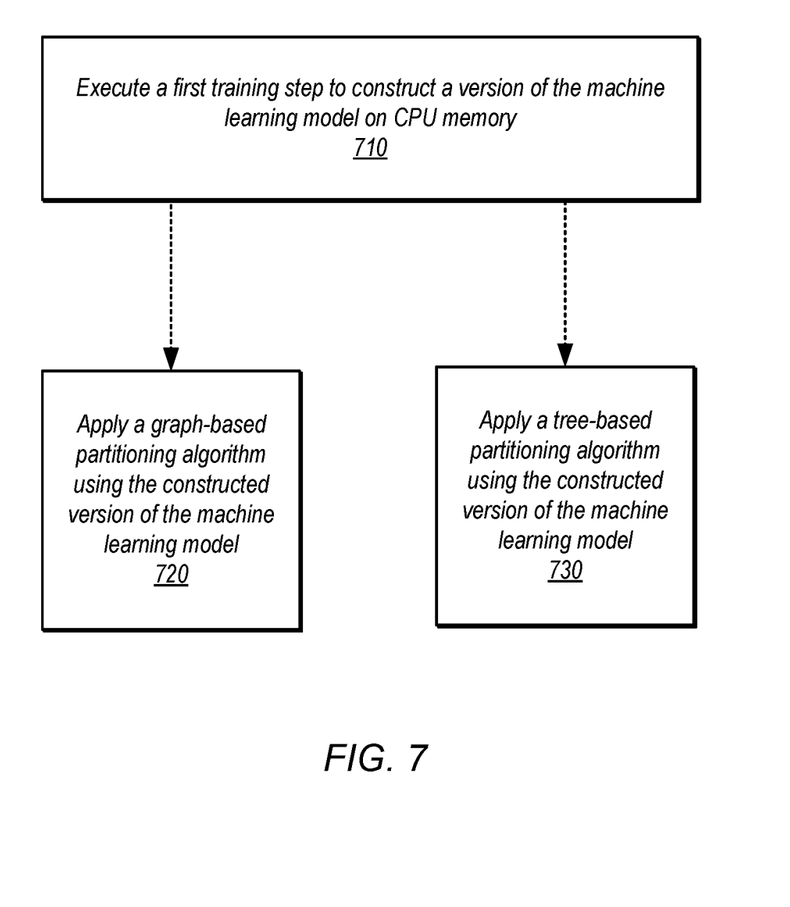
FIG. 7 illustrates a high-level flowchart of various methods and techniques to implement determining partitions for a machine learning model, according to some embodiments.

FIG. 7 illustrates a high-level flowchart of various methods and techniques to implement determining partitions for a machine learning model, according to some embodiments. As indicated at 710, a first training step of the machine learning model may be executed to construct a version of the machine learning model on CPU memory, in some embodiments. In this way, a larger model that exceeds GPU or other processing device capacity may still be analyzed. The constructed version of the machine learning model may then be used in various partitioning techniques, as discussed below at 720 and 730. In various embodiments, the constructed version of may be a graph.

As indicated at 720, a graph-based partitioning algorithm using the constructed version of the machine learning model. For example, optimal graph partitioning may be implemented, where each vertex and edge in the graph has a weight. The core optimization problem in graph partitioning is:

minimize sum_{edge e in graph cut c}weight(e)

subject to sum_{vertex v in partition p}weight(v)<C, for each p

The optimization problem may try to minimize the total weight of edges crossing the partition boundaries, subject to an upper bound on the total vertex weights in each partition. Here, edge weights represent the amount of communication needed between the two adjacent operations, and the vertex weights represent how "expensive" the specific computational node is. Therefore, what the optimization problem does is to minimize the amount of cross-device communication needed for the partition, subject to an upper bound on the computational load assigned to each device.

In some embodiments, a technique may be implemented for solving the graph optimization problem. Such a technique may include:

Graph coarsening: This step merges adjacent ops to create a "coarsened" graph, where a node in the coarse graph represents multiple nodes in the original graph. The goal here is to merge small operations into one and reducing the size of the graph, to reduce the computational complexity.

Kernighan-Lin: This is a standard graph partitioning algorithm that minimizes the sum of the graph edge cut, that operates over 2 partitions.

Refinement: Once K-L decision is made over the coarsened graph, this partitioned is projected back to the original graph, while at the same time refining the decision based on the additional information provided by the expanded graph In various embodiments, to reframe a graph in the form of pure combinatorial optimization problem, vector vertex weights may be assigned to each computational node. The vertex weight vector may have two elements: The first is, if the node represents a trainable weight, a normalized version of the size of the trainable weight, and 0 otherwise. The second weight is 1 for all nodes. The first component of the vertex weight enables balancing the memory footprint, whereas the second weight enables the balancing of computation. The graph-based partitioning technique may make the simplifying assumption that each node is equally expensive, in some embodiments. The edge weight choice made may be the logarithm of the tensor size corresponding to the edge.

In some embodiments, a tree-based partitioning technique may be implemented, as indicated at 730. The constructed version may constructed by performing a tracing run and may be used to determine tensor and parameter shapes. After this tracing run, a tree version of the machine learning model may be constructed which consists of nested nn.Module objects in the model, as well as additional data gathered from tracing, such as the amount of stored nn.Parameters, and execution time for each nn.Module. Next, it traverses this tree from the root and runs a partitioning algorithm that assigns each nn.Module to a device, which balances computational load (measured by module execution time) and memory use (measured by the total stored nn.Parameter size and activations). Every node is assigned a cost between 0.0 and 1.0, which represents the cost of storing and executing the node corresponding to the nn.Module. The cost is computed as Cost (node)=(memory_weight)* MemoryCost (node)+(1−memory_weight)*ComputationCost (node) where memory_weight is a user-defined parameter, MemoryCost may be the normalized sum of stored activations and parameters. ComputationCost may be the normalized execution time, gathered during tracing.

A tree-based partitioning technique may work iteratively, in a breadthfirst search manner, until the algorithm terminates. In every iteration, the algorithm may work on a specific node in the tree, along with a set of available devices that must be allocated across the children of this node. This allocation may be done going through the following steps:

Order the children based on the execution order determined in the tracing step

If there are K devices to be allocated, partition children into K segments using dynamic programming to minimize the maximum total cost of the nodes in each segment.

Re-assign each available device to a segment sequentially, (e.g., using d'Hondt algorithm).

If there are multiple devices assigned to a segment of size larger than 1, recursively repeat steps 2 and 3 for the segment. If no devices are assigned to a segment, it is by default assigned to the same device as the parent node.

Relabel the partition assignments such that the partition that requires the most communication is assigned to the same device as the parent node, so as to minimize the necessary communication.

If multiple nn.Modules share the same nn.Parameter, then these modules are placed on the same device to avoid maintaining multiple versions of the same parameter. This is done by combining these nn.Modules into a single node in the tree, in some embodiments.

In the graph and tree-based partitioning techniques discussed above, an optimization parameter, in various embodiments. In some embodiments, one optimization parameter may be a "speed" optimization parameter. In order to optimize for speed, partitioning techniques may balance a number of operations in a partition. In some embodiments, a speed optimization may also affect scheduling, as for speed, a less strict pipeline schedule may be implement implemented, in which a microbatch can start executing before a previous microbatch is completely finished on a device. In some embodiments, one optimization parameter may be a "memory" optimization parameter. In order to optimize for memory, a total number of stored trainable parameters (e.g., variable operations) may be balanced in each partition. In some embodiments, a memory optimization may also affect scheduling, as for memory, a strict pipeline schedule may be implemented (e.g., not starting execution of a microbatch before a previous microbatch is completely finished on a device).

The methods described herein may in various embodiments be implemented by any combination of hardware and software. For example, in one embodiment, the methods may be implemented on or across one or more computer systems (e.g., a computer system as in FIG. 8) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
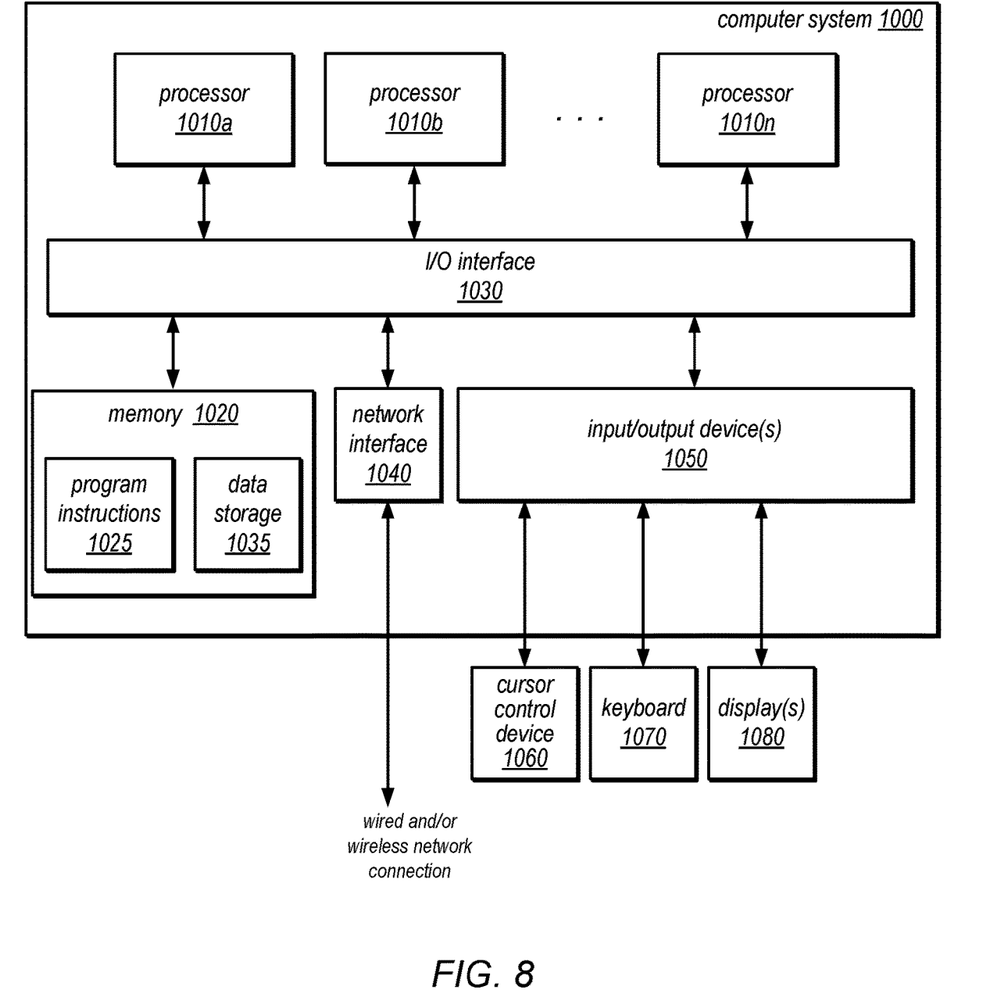
FIG. 8 illustrates an example system to implement the various methods, techniques, and systems described herein, according to some embodiments.

Embodiments of automatic partitioning of machine learning models for training across multiple devices as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system for automatic partitioning of machine learning models and parallel execution management for training across a plurality of devices for different machine learning frameworks, the system comprising:
   at least one processor; and
   a memory, storing program instructions that when executed by the at least one processor, cause the at least one processor to:
   receive a training job for a machine learning model that includes a request for automatic partitioning of the machine learning model across the plurality of devices, wherein the training job is a code file or a script;
   evaluate the request to determine one feature in an optimization parameter specified in the request for automatic partitioning, wherein the optimization parameter configures application of a partitioning technique applied to determine the different respective partitions in order to optimize one feature specified in the optimization parameter out of a plurality features that can be optimized;
   determine different respective partitions of the machine learning model based, at least in part, on a number of partitions and the optimization parameter, and wherein to determine the different respective partitions of the machine learning model, the program instructions cause the at least one processor to:

execute a first training run to construct a version of the machine learning model on a computer processing unit (CPU) memory; and
apply a selection of a tree-based partitioning algorithm or a graph-based partitioning algorithm using the constructed version of the machine learning model;
generate a schedule for executing the training job across the plurality of processing devices according to the different respective partitions of the machine learning model; and
cause the training job to be executed according to the schedule.

2. The system of claim 1, wherein the training job includes a request to use interleaved pipelining for executing the training job, and wherein the schedule for executing the training job is generated to perform interleaved pipelining across the plurality of processing devices.

3. The system of claim 1, wherein the at least one processor and the memory are implemented as part of a machine learning service offered by a provider network, wherein the training job is executed across a plurality of different training nodes implemented as part of the machine learning service, and wherein the machine learning service provides a description of the different respective partitions determined for the machine learning model via an interface of the machine learning service.

4. A method of automatic partitioning of machine learning models and parallel execution management for training across a plurality of devices for different machine learning frameworks, the method comprising:
receiving, at a machine learning system, a training job for a machine learning model that includes a request for automatic partitioning of the machine learning model across the plurality of devices, wherein the training job is a code file or a script;
evaluating, by the machine learning system, the request to determine one feature in an optimization parameter specified in the request for automatic partitioning, wherein the optimization parameter configures application of a partitioning technique applied to determine the different respective partitions in order to optimize one feature specified in the optimization parameter out of a plurality features that can be optimized;
determining, by the machine learning system, different respective partitions of the machine learning model to be trained across the plurality of processing devices, wherein the different respective partitions are determined based, at least in part, on a number of partitions specified in the training job for the machine learning model and the optimization parameter determined for the training job, and wherein to determine the different respective partitions of the machine learning model, the program instructions cause the at least one processor to:
execute a first training run to construct a version of the machine learning model on a computer processing unit (CPU) memory; and
apply a selection of a tree-based partitioning algorithm or a graph-based partitioning algorithm using the constructed version of the machine learning model;
generating, by the machine learning system, a schedule for executing the training job across the plurality of processing devices according to the different respective partitions of the machine learning model; and
executing, by the machine learning system, the training job according to the schedule.

5. The method of claim 4, wherein the optimization parameter is a memory optimization parameter that causes the determination of the different respective partitions to balance respective a total size of machine learning model variables in the different respective partitions.

6. The method of claim 4, further comprising inserting respective input operations and output operations to instruct communication between the different respective partitions of the machine learning model.

7. The method of claim 4, wherein determining the different respective partitions of the machine learning model to be trained across the plurality of processing devices comprises generating a profile of the machine learning model to determine one or more characteristics machine learning model used to select from different possible partitions of the machine learning model.

8. The method of claim 4, wherein the schedule for executing the training job is generated to perform simple pipelining across the plurality of processing devices as requested in the training job.

9. The method of claim 4, wherein the schedule for executing the training job is generated to use a number of microbatches across the plurality of processing devices.

10. The method of claim 4, wherein the schedule for executing the training job is generated to perform interleaved pipelining across the plurality of processing devices.

11. The method of claim 4, wherein the training job is received via an interface for the machine learning system that implements different user interface elements to specify the number of partitions and the optimization parameter.

12. One or more non-transitory, computer-readable storage media, storing program instructions of automatic partitioning of machine learning models and parallel execution management for training across a plurality of devices for different machine learning frameworks that when executed on or across one or more computing devices cause the one or more computing devices to implement:
receiving a training job for a machine learning model that includes a request for automatic partitioning of the machine learning model across the plurality of devices, wherein the training job is a code file or a script;
evaluating the request to determine one feature in an optimization parameter specified in the request for automatic partitioning, wherein the optimization parameter configures application of a partitioning technique applied to determine the different respective partitions in order to optimize one feature specified in the optimization parameter out of a plurality features that can be optimized;
determining different respective partitions of the machine learning model to be trained across the plurality of processing devices, wherein the different respective partitions are determined based, at least in part, on a number of partitions specified in the training job for the machine learning model and the optimization parameter determined for the training job, and wherein to determine the different respective partitions of the machine learning model, the program instructions cause the at least one processor to:
execute a first training run to construct a version of the machine learning model on a computer processing unit (CPU) memory; and
apply a selection of a tree-based partitioning algorithm or a graph-based partitioning algorithm using the constructed version of the machine learning model;
generating a schedule for executing the training job across the plurality of processing devices according to the different respective partitions of the machine learning model; and causing the training job to be executed according to the schedule.

13. The one or more non-transitory, computer-readable storage media of claim 12, wherein the optimization parameter is a speed optimization parameter that causes the determination of the different respective partitions to balance respective numbers of machine learning model variables and machine learning model operations in the different respective partitions.

14. The one or more non-transitory, computer-readable storage media of claim 12, wherein, in determining the different respective partitions of the machine learning model to be trained across the plurality of processing devices, the program instructions cause the one or more computing devices to implement generating a profile of the machine learning model to determine one or more characteristics machine learning model used to select from different possible partitions of the machine learning model.

15. The one or more non-transitory, computer-readable storage media of claim 12, wherein the training job includes a request to use interleaved pipelining for executing the training job, and wherein the schedule for executing the training job is generated to perform interleaved pipelining across the plurality of processing devices.

16. The one or more non-transitory, computer-readable storage media of claim 12, wherein the training job invokes an automatic partitioning library and specifies the number of partitions and the operation parameter according to an Application Programming Interface (API) of the automatic partitioning library.

17. The one or more non-transitory, computer-readable storage media of claim 12, wherein the one or more computing devices are implemented as part of a machine learning service offered by a provider network, wherein the training job is executed across a plurality of different training nodes implemented as part of the machine learning service, and wherein the machine learning service provides a description of the different respective partitions determined for the machine learning model via an interface of the machine learning service.

* * * * *